Feb. 7, 1961 H. F. OLSON ET AL 2,971,057

APPARATUS FOR SPEECH ANALYSIS AND PRINTER CONTROL MECHANISMS

Filed Feb. 25, 1955 9 Sheets-Sheet 1

INVENTORS
Harry F. Olson &
Herbert Belar

BY Morris & Rabkin

ATTORNEY

INVENTORS
Harry F. Olson &
Herbert Belar
BY Morris L. Rabkin
ATTORNEY

INVENTORS
Harry F. Olson &
Herbert Belar
BY Morris L. Rabkin
ATTORNEY

INVENTORS
Harry F. Olson &
Herbert Belar
BY
ATTORNEY

Feb. 7, 1961

H. F. OLSON ET AL

APPARATUS FOR SPEECH ANALYSIS AND PRINTER CONTROL MECHANISMS 2,971,057

Filed Feb. 25, 1955

9 Sheets-Sheet 5

INVENTORS
Harry F. Olson &
Herbert Belar
BY [signature]
ATTORNEY

Feb. 7, 1961

H. F. OLSON ET AL
APPARATUS FOR SPEECH ANALYSIS AND
PRINTER CONTROL MECHANISMS 2,971,057

Filed Feb. 25, 1955

9 Sheets-Sheet 6

INVENTORS
Harry F. Olson &
Herbert Belar
BY Morris L. Rabkin
ATTORNEY

INVENTORS.
Harry F. Olson &
Herbert Belar
BY Morris L. Rabkin
ATTORNEY

Feb. 7, 1961 H. F. OLSON ET AL 2,971,057

APPARATUS FOR SPEECH ANALYSIS AND PRINTER CONTROL MECHANISMS

Filed Feb. 25, 1955 9 Sheets-Sheet 8

INVENTORS
Harry F. Olson &
Herbert Belar
BY Morris Rabkin
ATTORNEY

INVENTORS
Harry F. Olson &
Herbert Belar
BY Morris B. Rabkin
ATTORNEY.

United States Patent Office 2,971,057

Patented Feb. 7, 1961

2,971,057

APPARATUS FOR SPEECH ANALYSIS AND PRINTER CONTROL MECHANISMS

Harry F. Olson, Princeton, and Herbert Belar, Palmyra, N.J., assignors to Radio Corporation of America, a corporation of Delaware Filed Feb. 25, 1955, Ser. No. 490,592

23 Claims. (Cl. 178—31)

The present invention relates to speech analysis and the operation of a recorder, such as a printer, under control of signals derived as a result of speech analysis, and more particularly, but not necessarily exclusively, to apparatus for analyzing speech sounds for the purpose of deriving printer control signals in a novel manner to control operation of a printer.

In accordance with the present invention, the sounds of speech are analyzed in a novel manner and the results of the analysis are identified by electrically operated means. This latter means performs selecting operations which provide signals for control of a printing recorder, such, for example, as a typewriter. These signals may represent a simplified typewritten version of ordinary speech. Speech can be recorded in accordance with the present invention in simplified form with a high degree of intelligibility irrespective of correct conventional spelling. Recorded results in the form of a typewritten output, for example, have the great advantage of being instantly legible to anyone who can read English. The output can be used for internal correspondence and for recording of notes without further transcription. The output can be filed with other papers as contrasted to the filing problem of a sound disc or magnetic tape.

It can be shown that 732 words form over 75 percent of all words, that 339 syllables form over 75 percent of all syllables and that 19 sounds form over 75 percent of the sounds. In the case of sounds, approximately 40 sounds form 100 percent of all the sounds. These statistics are of importance in selecting the form of presentation so that highest intelligibility can be attained with the least complication.

The sounds of speech can be typed in a pseudo-phonetic form as follows:

the ultimit object is too develup a tipriter which tips in respons too wurds spoken intoo a mikrophon the outpoot being imediatli legibl and usabl for intra ofis wurk filing and eventual transkripshun intoo konvenshunal leters The important factors in the above presentation are as follows: The use of thirty-six phonetic entities. Ninety-five percent word intelligibility. One hundred percent sentence intelligibility. A maximum of two letters per phonetic entity. Thirty-six percent conventional spelling.

Speech can be typed in the form of syllables as follows:

the ultimet object is to develop a typerighter which types in respons to words spocan into a mycrophone the output being immediately legible and yousable for intra ofis work filing and eventual transcription into conventional english The important factors in the above presentation are as follows: The use of approximately one thousand syllables. One hundred percent word intelligibility. One hundred percent sentence intelligibility. Eighty-five percent conventional spelling.

Speech can be typed in the form of words as follows: the ultimate object is to develop a typewriter which types in response to words spoken into a microphone the output being immediately legible and usable for intra office work filing and eventual transcription into conventional letters The important factors in the above presentation are as follows: The use of approximately ten thousand words. One hundred percent word intelligibility. One hundred percent sentence intelligibility. One hundred percent conventional spelling.

A consideration of the three systems of presentation from the standpoint of the relationship between correct conventional spelling and the number of memory units required in a machine in accordance with the present invention for typing directly from the spoken word shows that spelling accuracy is very poor in the phonetic system. However, if there is a question of the relative value in a speech recording machine, intelligibility is more important that correct spelling. From the standpoint of intelligibility the phonetic system as given in the first example will give a high order of intelligibility. The advantage of the phonetic system is that the number of memory units required is much smaller than in the syllable or word system. The phonetic system in the first example is, of course, a quasi-phonetic system. Nevertheless, it has the great advantage of being instantly legible to anyone who can read English. In view of these factors an illustrative example of a speech recording apparatus has been designed to type in the pseudo-phonetic form.

An important object of the present invention is to provide novel apparatus for analyzing speech sounds for the purpose of deriving control signals.

Another object of the present invention is to provide novel apparatus for operating a recording printer under control of signals derived from the analysis of speech sounds.

A further object of the present invention is to provide novel apparatus for analyzing a spoken sound in terms of frequency, time and amplitude.

A still further and closely related object is to provide a visual indication of the just mentioned analysis.

A still further object of the present invention is to provide a novel means for deriving control signals as a result of speech analysis.

A still further object of the present invention is to provide a novel arrangement for storing signals representing other signals initially obtained by analysis of speech sounds.

A still further object of the present invention is to provide novel means for applying signals to control the operation of a printer such, for example, as a typewriter.

Other objects and advantages of the present invention will, of course, become apparent and immediately suggest themselves to those skilled in the art to which the invention is directed from a reading of the following specification in connection with the accompanying drawings in which.

The method of sound analysis developed in accordance with the present invention will be discussed before the illustrative embodiment of apparatus for employing signals resulting from the analysis is described. The amplitude of a typical vowel sound as a function of time shows that speech carries a tremendous amount of information. The vowel sound is I (ai). However, there is nothing immediately apparent from the characteristic of a vowel in this form that can be used to identify and differentiate this vowel sound from another vowel or for that matter other sounds, so that the sound can be used to actuate a speech machine. It was discovered that to obtain this objective, it is necessary to break down the time characteristic of a sound into the parameters that carry the phonetic information in speech.

Figure 1:
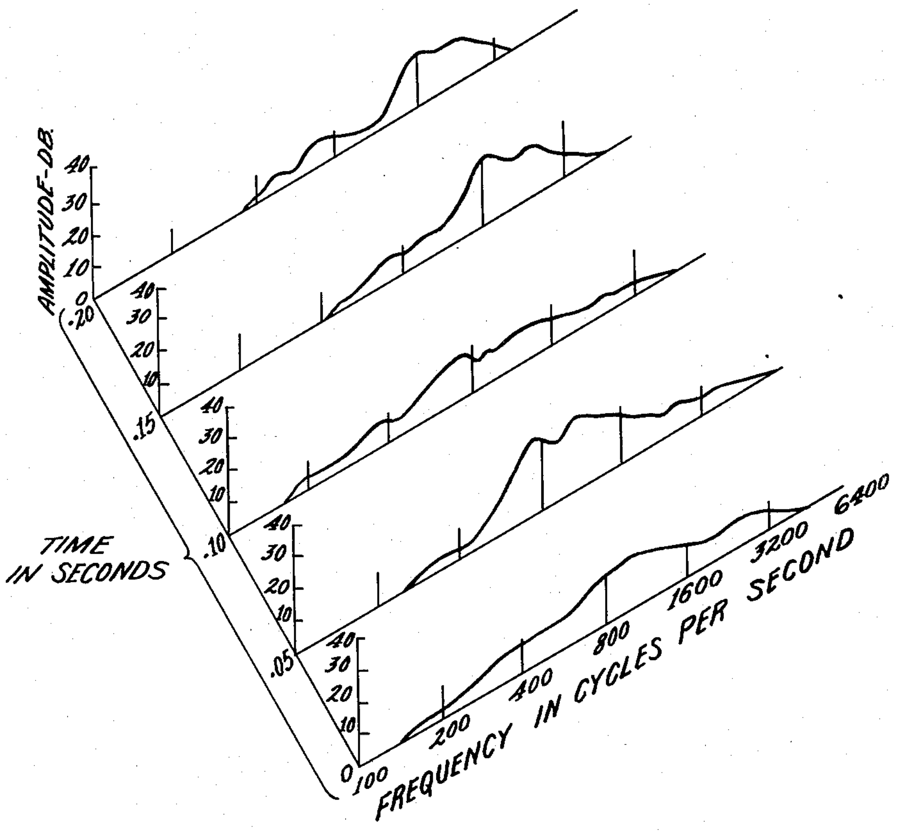
Fig. 1 is a graph showing the frequency, time and amplitude characteristics of a vowel sound.

The amplitude characteristic as a function of the time can be analyzed into response frequency characteristics at discrete frequency intervals. Five response frequency characteristics of the vowel I at 0, .05, .1, .15 and .2 second are shown in Fig. 1. In this illustration the parameters are amplitude and frequency at discrete time intervals.

Figure 2:
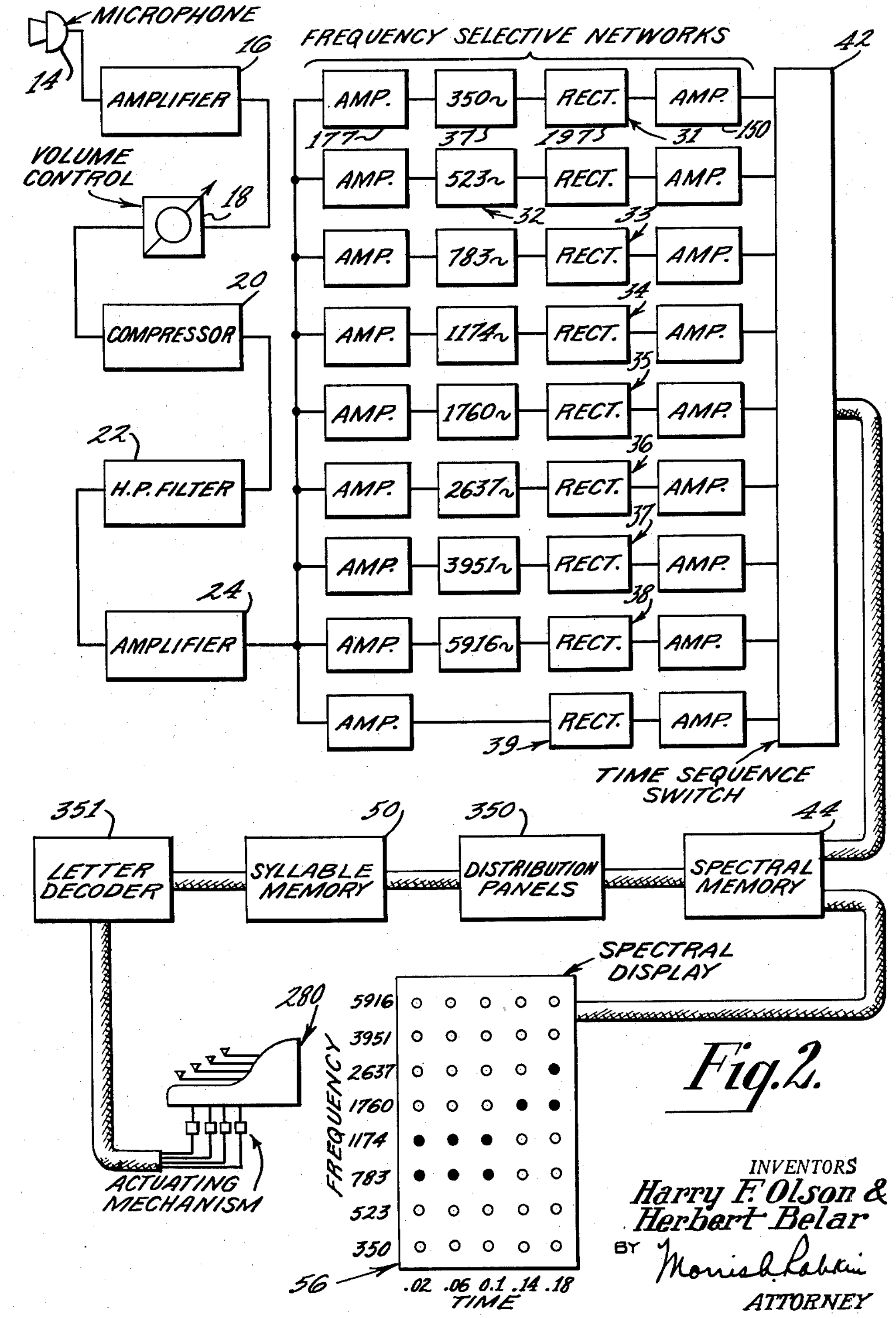
Fig. 2 is a schematic diagram showing a complete system in accordance with the invention for printing a record of spoken sounds.

If a definite upper amplitude limit is selected and discrete sections with respect to time are selected, the frequency-time-amplitude characteristic may be as shown on the spectral display portion of Fig. 2. This characteristic may be used as the basis for a phonetic typewriter.

Figure 5:
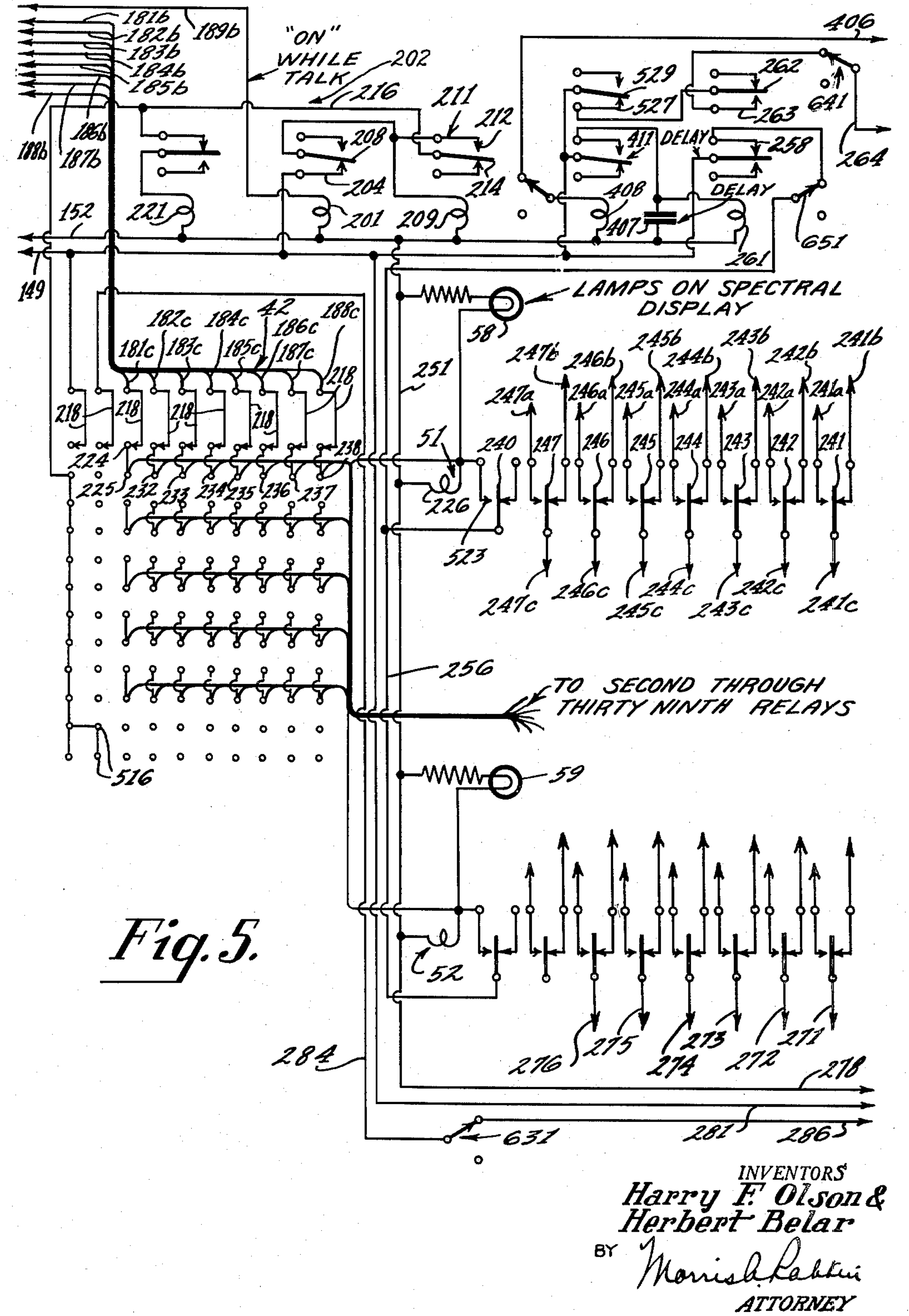
Fig. 5 is a schematic showing of the spectral memory and spectral display of Fig. 1 taking the form of a sequencing switch and master decoder.

The elements of a system in accordance with this invention which will provide a visible spectrum display of sounds of the voice are shown in Fig. 2. The sound is picked up by a microphone 14 and converted into the corresponding electrical variations by a voltage amplifier 16. The voltage amplifier is followed by a gain control 18 which in turn is followed by a vacuum tube compressor-amplifier 20. The output of the compressor is filtered at 22 by a high pass filter and is fed to a power amplifier 24. The output of the power amplifier is fed to eight selective networks or channels designated generally by reference characters 31 to 38. The center frequency of each of the selective channels is indicated on Fig. 2. A channel 39 has a generally uniform frequency response and its output performs a control function as will hereinafter appear. The outputs of the frequency selective networks are fed to a time sequence switch 42. The time sequence switch connects the output of the frequency selective networks to a group of relays in time sequence. In the illustrative example shown more in detail by Fig. 5, forty relays are employed and are comprised in the spectral memory 44. For the sake of convenience of illustration and description, only two of these relays, designated 51 and 52 (Fig. 5) are shown in detail. For example, the output of the 350 cycle network is fed to the first relay for the first time interval, for example 0 to .04 second; the output of the 523 cycle network is fed to the second relay for the same time interval. Now, the time switch moves to the second time interval, for example .04 to .08 second, and connects the selective networks 350, 523 cycles, etc. to the ninth and tenth relays, etc. This process is repeated for the remainder of the relays centered around the frequency intervals shown in Fig. 2. The relays are amplitude selective. That is, a relay will not be actuated unless there is sufficient current to close it. Thus, the sounds of sufficient amplitude will close the relay. After the relay closes, it holds until released. A spectral display 56 composed of forty lights, two of which, 58 and 59, appear in Fig. 5 is provided. Relay 51 actuates the light 58 and the second relay actuates the second light, etc. If the vowel sound I (ai) is picked up by the microphone 14, the spectrum display for a certain value of the gain control will be as shown in Fig. 2 by the shaded circles representing the lights. This can be deduced from a consideration of Fig. 1. Another vowel sound will present a different display. As a matter of fact, the various fundamental sounds of speech will exhibit different spectrum displays. The speech information in the form of amplitude and frequency components is quantized as a function of time by the time sequence switch 42 and the spectral memory 44. The amplitude and frequency characteristic of a sounded speech syllable is sampled at five discrete time intervals in the system illustrated in Fig. 2 and is quantized due to the amplitude selective response of the relays in the spectral memory 44. The speech information is therefore converted from analog form at the output of the frequency selective networks to digital form in the spectral memory 44. Electrical signals which are the analogs of different sounds will be applied to different relays in the spectral memory. Accordingly, the digital information into which the sounds are converted will be applied to different locations in the spectral memory 44. A particular location for an individual sound can be observed by inspection of which of the lamps in the spectral display 56 are illuminated.

A syllable memory 50 is provided for storing a syllable which is set up on operation of relays in the spectral memory 44. The syllable memory 50 also may include several relays, each of which corresponds to a different selected syllable. The relays in the spectral memory 44 have their contacts interconnected in accordance with a digital code. Operation of certain of the relays in the spectral memory satisfies the code for one syllable, while operation of certain other of the relays satisfies the code for other syllables. The information in the spectral memory 44 is transferred to the syllable memory 50 after operation of the relays in the spectral memory by means which will be described in detail hereinafter. When the digital code for a particular syllable is satisfied, a relay in the syllable memory 50 corresponding to the code is energized.

The relays in the syllable memory 50 are connected to a letter decoder 351 which may incorporate a rotary switch and a matrix, as will be explained in greater detail hereinafter. The decoder 351 converts the digital information representing different syllables into consecutive letters by operating an actuating mechanism of a typewriter 280.

The system shown in Fig. 2 and described above is a time-frequency-amplitude analyzer employing five time intervals, eight frequency bands and one amplitude level. It will be understood that two or more steps of amplitude may be provided to obtain greater discrimination. Two relays may be provided for each time interval and each frequency band. One set of relays may be actuated by a certain fixed level. The other set of relays may be actuated by another certain fixed level which is, for example, higher than the level which actuates the first set of relays. Two sets of lights corresponding to the two levels of amplitude may be provided. One set may be lighted by one amplitude level and the second set by the second level.

To convert speech information in the form of frequency bands, time intervals and amplitude levels to the corresponding printed or typed page requires memory and switching mechanisms as described hereinafter.

Figure 3:
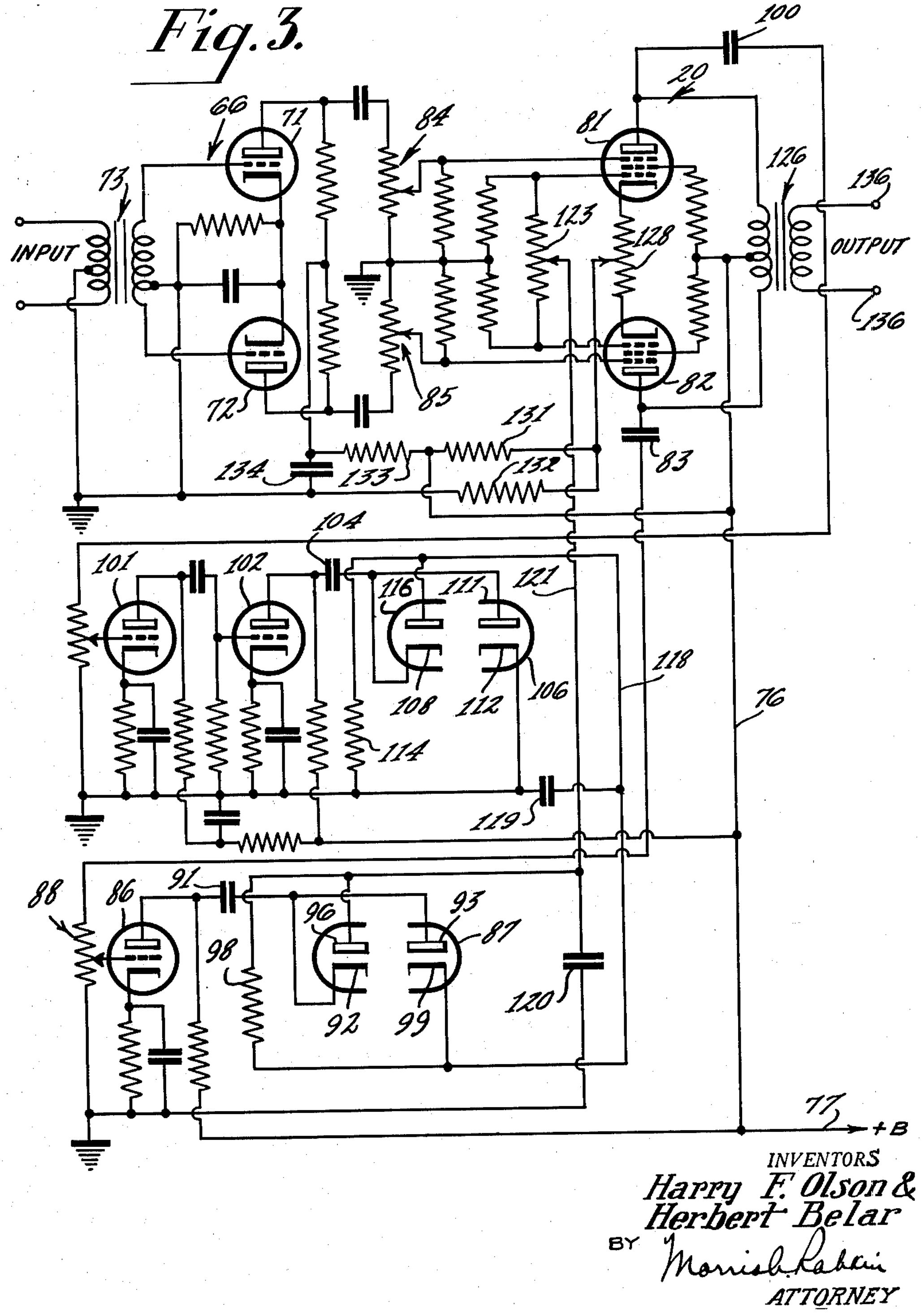
Fig. 3 is a schematic showing of the preamplifier and compressor amplifier appearing in block form in Fig. 2.

In the course of normal speech, as used in dictation, the amplitude level may vary over wide limits. Since analysis is a function of the amplitude level, some means must be provided to maintain a relatively constant output level over a wide range of input levels. This is accomplished by the previously mentioned volume compressor 20. An electronic volume compressor is a system which reduces the amplification of a vacuum tube amplifier when the signal being amplified is large and increases the amplification when the signal is small. A schematic diagram of the compressor 20 is shown in Fig. 3 of the drawing. It is preceded by a push-pull amplifier 66. The amplifier 66 is made up of two tubes 71 and 72 which may be a single type 12AU7 tube. Suitable biasing voltages are applied to this tube in known manner and the input is applied to the signal grids by way of an input transformer 73. Plate voltage is supplied by way of a conductor 76 connected as indicated at 77 to a suitable source (not shown) of positive voltage labelled +B. The controlled compressor amplifier 20 comprises tubes 81 and 82. These two tubes may take the form of a single 6BE6 tube. The speech input is applied to the No. 3 grids, for example, of the tubes 81 and 82 by way of a pair of balancing potentiometers 84 and 85 which serve as volume controls for each half of the push-pull stage.

The output of the tube 82 is fed by way of a capacitor 83 to a single stage amplifier 86 and a rectifier 87. The input to the amplifier 86 is controllable by a potentiometer 88. The rectifier 87 is made up of two diodes which may, for example, be the halves of a 6AL5 tube. The output of the amplifier 86 is coupled by way of a capacitor 91 to the cathode 92 of the first diode and the anode 93 of the second diode. The anode 96 is connected by way of the load resistor 98 to the cathode 99 of the second diode thereby completing the D.C. path.

The output from the tube 81 of the compressor amplifier 20 is applied by way of a capacitor 100 to the first stage tube 101 of a two stage amplifier. The output from the second stage tube 102 of the two stage amplifier is applied by a coupling capacitor 104 to a rectifier 106. The connections of the rectifier 106 are similar to the connections of the rectifier 87. The output from the tube 102 is applied to the cathode 108 of the first diode of the rectifier and to the anode 111 of the second diode of the rectifier. The cathode 112 of the second diode is connected to a circuit reference point, in this instance ground, in the compressor amplifier arrangement of Fig. 3. A diode load resistor 114 is connected between the anode 116 of the first diode and the cathode 112 of the second diode to complete the D.C. load circuit of the diode 106. The negative end of the load resistor 114 at the anode 116 is connected by way of a conductor 118 to the cathode 99 of the second diode of the rectifier 87. A filter capacitor 119 is connected between the conductor 118 and ground. A second filter capacitor 120 is connected between the anode 96 and ground. The anode 96 of the first diode of the rectifier 87 is connected by means of a conductor 121 to the No. 1 grids of the tubes 81 and 82 which in turn are connected to the ends of the resistor of the potentiometer 123. By the connection shown, the outputs of the rectifiers 87 and 106 are added and applied to the grids of the tubes 81 and 82 comprising the push-pull output stage 20. An output transformer 126 provides an output connection from the stage 20. The cathodes of the tubes 81 and 82 are connected to the ends of the resistor of a potentiometer 128. The sliding contact of this potentiometer is connected to a circuit reference point which is positive with respect to ground. The latter connection is provided by voltage divider resistors 131 and 132. A series resistor 133 and a decoupling capacitor 134 provide the positive supply for the anodes of the tubes 71 and 72. The potentiometer 128 provides a balancing control at high gain. The potentiometer 123 provides a balancing control at low gain. The former adjusts the cathode voltages and the latter the bias voltages of the number one grids.

The tubes in the output stage are of the variable transconductance type which means that the amplification of the tube will vary as the voltage applied to the first grid is varied. The output of the rectifiers 87 and 106 is a function of the input to the amplifier. The amplification of the amplifier is an inverse function of the bias applied to the first grids of the output stage 20. Thus, it will be seen that as the input to the amplifier increases the negative bias applied to the first grids of the output stage will be increased which in turn will decrease the amplification factor of the amplifier. The net result is a gradual reduction in gain with increase of the input.

Figure 4:
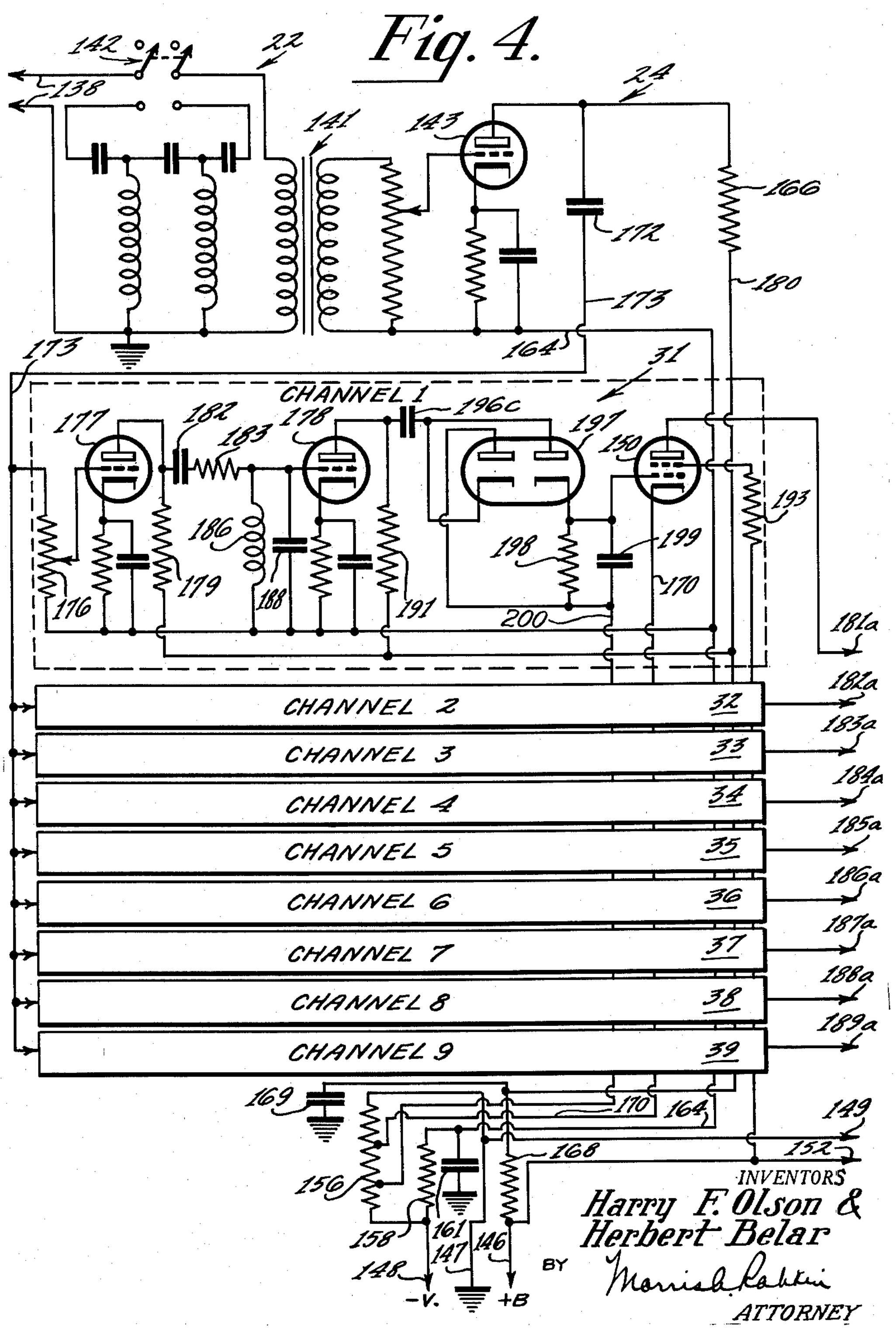
Fig. 4 is a schematic diagram of the frequency selective amplifiers and the actuating amplifier appearing in block form in Fig. 2.

Following the compressor amplifier is the frequency analyzing system which is indicated by reference characters 31 to 38 on Fig. 2 of the drawing and is shown more in detail by Fig. 4 of the drawing. The output of the transformer 126 in Fig. 3 appears at terminals 136 which are to be connected to input terminals 138 of Fig. 4. The input to the frequency analyzing system passes through the high pass filter 22 (Figs. 2 and 4) to the primary of an interstage transformer 141. Since there is very little information in speech below 200 cycles this portion of the range can be eliminated without any appreciable loss. In view of this fact, the high pass filter 22 is used to reduce the deleterious effects of ambient noises which occur in the low frequency range. The filter 22 may be of any known type with the lower frequency cut off at about 200 cycles. A double-pole, double-throw switch 142 is provided so that the filter 22 may be cut out of the circuit when desired. The secondary of the transformer 141 feeds the signal onto the grid of an amplifier tube 143.

The power supply (not shown) for the apparatus of Fig. 4 may be of any known or desired type and is to be connected to terminals 146, 147 and 148. The positive terminal of the power supply is to be connected to the terminal 146 labeled +B. The terminal 147 is a voltage reference point of the system and it may, if desired, be a ground connection. The lead from the terminal 147 is extended to the apparatus of Figs. 5, 6 and 7 by way of a conductor 149. The connection to the positive supply terminal 146 is also extended by way of a conductor 152. The lead from the negative terminal 148 of the power supply is connected to ground through a voltage dividing resistor 156. A dropping resistor 158 and a decoupling capacitor 161 provide a cathode lead connection for the tube 143 by way of a conductor 164. The anode of the tube 143 is connected by way of a load resistor 166 and a dropping resistor and decoupling condenser combination 168 and 169 to the positive supply terminal 146.

The output of the tube 143 is applied by way of a coupling capacitor 172 to a conductor 173. The conductor 173 serves as an input lead for the frequency separation channels 31 to 39 which are shown schematically on Fig. 2 and Fig. 4 of the drawing. One of these channels, namely the chanel 31, is shown in more detail on Fig. 4 of the drawing. The resistor of an input potentiometer 176 is connected between the conductor 173 and the conductor 164. The sliding contact of the potentiometer is connected to the grid of the first stage tube 177. The interstage coupling means between the tube 177 and the second stage tube 178 includes a bandpass filter means now to be described. The anode of the tube 177 is connected to a load resistor 179 to the positive power supply through the dropping resistor 168. This latter connection is effected by way of a conductor 180 to which the previously mentioned load resistor 166 for the tube 143 is connected. The anode of the tube 177 is connected to the grid of the tube 178 by way of a capacitor 182 and a resistor 183.

The bandpass filter 31 is made up of the inductance 186 and a capacitor 188. In the illustrative example, the inductance has a value of .08H and the capacitor 188 has a value of 2.6 mf. This peaks the bandpass response at substantially 350 cycles. The remaining interstage coupler filters for the channels 32 to 38, inclusive, are selected in accordance with known principles to obtain center frequency responses as indicated on Fig. 2 of the drawing.

The interstage coupler for the ninth channel designated by reference character 39 includes only the usual grid resistor rather than the combination of inductance and capacity present in the other channels. The channel 39, therefore, has a relatively flat response and passes the output of the high pass filter 22 substantially without attenuation.

The anode of the tube 178 is connected by way of a load resistor 191 to the conductor 180. The grids and cathodes of the tubes 177 and 178 are returned to the conductor 164. The output of the tube 178 is connected by way of a coupling condenser 196C to the cathode and the anode, respectively, of a pair of diodes in a rectifier tube 197. The latter may, for example, be a 6AL5 type tube. The anode of one diode and the cathode of the other diode is connected to a rectifier load resistor 198. The load resistor 198 is shunted by a filter capacitor 199. The double diode connection provides a direct current path through the load resistor 198. The negative end of the diode load resistor is connected to a conductor 200 which is in turn connected to a tap on the voltage divider resistor 156. The positive end of the load resistor 198 is direct current coupled to the grid of a direct current amplifier tube 150. The cathode of the tube 150 is returned by way of a conductor 170 to another tap on the voltage divider resistor 156.

The anode circuit of the output tube 150 is completed through circuits of the apparatus shown on Fig. 5 of the drawing and to be later described. For this purpose the anode of the tube 150 is connected to the first terminal **181*a* of a series of terminals 181*a* to 189*a*. These terminals 181*a* to 189*a* may be combined in the socket of a connector along with the terminals of the conductors 149 and 152. On Fig. 5, the terminals 181*b* to 189*b* are to be connected to the terminals 181*a* to 189*a***, respectively, of Fig. 4.

The screen grid of the tube 150 is connected by way of a dropping resistor 193 to the positive terminal 146 of the power supply. The amplifiers and rectifiers of the channels 32 through 39 are connected to the power supply terminals by way of the conductors 200, 170, 164 and 180 in the manner described for channel 31 which is shown in detail in Fig. 4 of the drawing. The screens of the output tubes are similarly connected.

Fig. 5 of the drawing shows the sequencing switch and master decoder for the speech input to the microphone 14. The conductors 149 and 152 appear again at the left hand side of Fig. 5 of the drawing. The terminal **189*b*, which is connected to the anode of the direct current amplifier tube (not shown) in channel 39, in the same manner as the connection for the tube 150, is connected to the operating coil 201 of a relay 202. The remaining terminal of the operating coil 201 is connected to the conductor 152 which connects the positive terminal 146 of the power supply. The relay 202 is provided with a front contact 204. The contact 204 is connected to the conductor 149 or "ground" to which it will be referred for the sake of convenience of description hereinafter. The armature or tongue 208 is connected to the operating coil 209 of a second relay 211 and, also, to the back contact 212 of this relay. The tongue 214 of the relay 211 is connected to a conductor 216**, the purpose of which will hereinafter be described.

The time sequence switch 42, which appears diagrammatically in Fig. 2 of the drawing, is shown in schematic detail on Fig. 5. This switch is a rotary switch of the stepper type having ten levels. This switch also has twelve contact positions for the wipers 218 which are indicated schematically on Fig. 5. The previously mentioned conductor 216 is connected to the stationary contacts of the first level of the switch except the first contact thereof. The conductor 216 is also connected to the last two stationary contacts 516 of the first level of the switch. The connections **181*b* to 188*b* are connected, respectively to eight wiper arms 218 of the switch, as indicated by reference characters 181*c* to 188*c*. The stationary contacts of the eight levels of the switch 42, traversed by the wiper arms connected to the terminals 181*c* to 188*c***, are connected in a manner to be described in detail to a plurality of relays, two of which are shown in detail, at the right hand side of Fig. 5 of the drawing.

The rotary switch 42 may, for example, have a double set of stationary contacts (not shown) and a corresponding set of projecting wipers 218 so that the wiper scanning operation will be repeated twice for each revolution of the wiper arms. A rotary switch suitable for the purposes is represented by the Automatic Electric Company Type 45 Stepping Switch.

The mode of operation of the apparatus thus far described on Fig. 5 of the drawing will now be explained. When sound impinges on the microphone 14 (Fig. 2) the amplifiers in channel 39 of Figs. 2 and 4 transmit the sound continuously since this channel is not frequency selective and the relay coil 201 is energized causing the tongue 208 to engage the front contact 204. This causes ground to be applied to the conductor 216 through the normally closed contacts 212 and 214 of relay 211. Energization of the relay 201 also energizes the relay coil 209. A short time after energization of the relay 202, the tongue 214 leaves the back contact 212 and removes the ground which was momentarily applied to the conductor 216. Application of ground to the conductor 216, in the form of a pulse as indicated, energizes the stepping magnet 221 of the rotary stepper switch 42. This causes the set of wipers 218 to be advanced to the next successive set of stationary contacts. At this time the second contact following the "homing" position of the wiper arms in the first level is engaged by the first level wiper arm thereby to maintain ground on the conductor 216. The stationary contacts, of which there are twelve sets including the homing contacts, are connected in pairs of eight levels of the switch 42 which appear to the right as viewed in Fig. 5. For example, in the third level the stationary contact 224 is connected to the next succeeding stationary contact 225. This allows the wiper contacts 218, which are connected to the terminals **181*c* to 189*c*** to remain in contact with the connections, later to be described, to the series of relay coils.

As pointed out in the description of Fig. 2, the spectral memory 44 includes forty relays. The first and last relays, namely 51 and 52, in the series of forty are shown in schematic detail on Fig. 5 of the drawing. Stationary contacts 224 and 225 of the switch 42 are connected to the operating coil 226 of the relay 51. Stationary contacts 232 to 238 are connected to the second to the eighth relays, respectively. These contacts 232 to 238 are paired as described for the contacts 224 and 225. These latter relays, as well as the ninth to the thirty-ninth relays, are, for the sake of convenience, omitted from the showing of Fig. 5 as stated above. The relay 51 is provided with a set of eight armatures or contact tongues 240 to 247. Each tongue engages a back contact when the relay is deenergized and engages a front contact when the relay is energized. The front and back contacts, engaged by the tongues 241 to 247, are available as shown on Fig. 5 at the terminals designated **241*a* to 247*a* and 241*b* to 247*b*. The relay tongues are connected to terminals 241*c* to 247*c*. The schematic arrangement shown provides for connection of the tongue and corresponding front and back contacts of all of the relays in accordance with coded arrangements, examples of which are given by Figs. 9 and 10 of the drawing. The tongue 241 of the relay 51 can be considered as corresponding to the tongue in the same position for the other thirty-nine relays as will again be pointed out in connection with the description of Figs. 9 and 10. The operating coil 226 of the relay 51** is connected, as stated above, to the stationary contacts 224 and 225 of the rotary switch 42.

Upon occurrence of the events discussed above in connection with the operation of the relay 202 the relay 51 will be energized if sound energy is present having a frequency of 350 cycles per second. With the assumed example of the sound for the letter I the relay 51 will not be energized, at least initially. Assuming that sound energy is present in the range of 350 cycles per second then the coil 226 of the relay 51 will be energized by way of the stationary contacts 224 and 225 over a circuit from the terminal 152 by way of the conductor 251, the relay coil 226, the switch contact 224 or 225, the corresponding wiper arm 218 and the anode of the tube 150 in channel 31 shown on Fig. 4 of the drawing. The relay tongue 240 will make contact with the front contact 523 so that the relay will be locked by way of the tongue 240 to the conductor 256. The conductor 256 is connected to the terminal 149 and ground by way of the back contact 258 of a relay 261 which is deenergized at this time. The relay 261 is of the delayed release type.

A tongue 262 and front contact 263 provides for operation of the spacing mechanism of the typewriter or any other desired printer function. The contact 263 is connected by way of a conductor 264 to a solenoid 266 as indicated on Fig. 8 of the drawing. This is indicated as being a "space bar" operator.

It will be seen that as the wiper arms 218 progress over the stationary contacts in the rotary switch 42, various ones of the relays will be energized. In the assumed example for I and with an assumed predetermined coding, the third, fourth, eleventh, twelfth, nineteenth and twentieth relays must be energized. One of the thirtieth, twenty-ninth, thirty-seventh or thirty-eighth relay must be energized. The seventh, eighth, ninth, fourteenth, fifteenth, sixteenth, seventeenth, twenty-third, twenty-fourth, twenty-fifth, thirty-first, thirty-second, thirty-third, thirty-ninth and fortieth relays must be off. Energization and deenergization of the relays for the letter I is based on the code wiring shown in Fig. 9 of the drawing. It will be understood that this code wiring may be varied. The various relay tongues shown in Fig. 9 correspond to a single set of tongues, for example the tongues corresponding to the tongue 241 for the relay 51 in Fig. 5.

Figure 6:
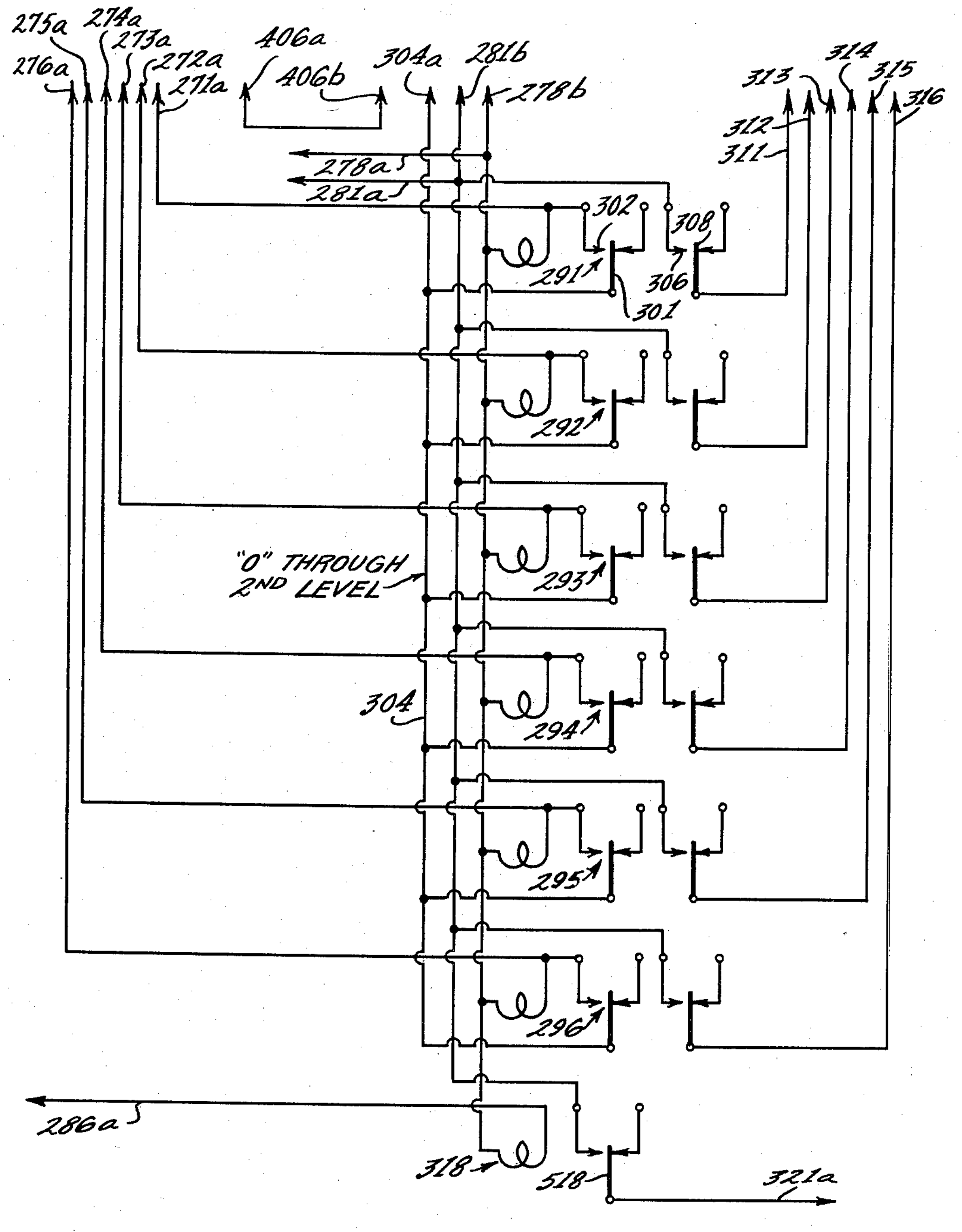
Fig. 6 is a schematic diagram of the syllable memory appearing in Fig. 2 of the drawing and taking the form of a set of syllable code relays.

The relay tongues of the relay 52, which is the fortieth relay of the set, are connected to terminals 271 to 276. These terminals are available for connection to the similarly labelled terminals 271a to 276a on Fig. 6 of the drawing each of which is connected to the operating coil of a relay in a group of six relays 291 to 296. A connection to the tongue of the seventh relay is not used in the present embodiment for reasons to be discussed hereinafter. The +B connection is forwarded by way of a terminal 278 and is available for connection to the terminal 278a (Fig. 6). The ground connection is forwarded by way of a terminal 281 and is available for connection to the terminal 281a (Fig. 6). The wiper of the second level of the rotary switch 42 of Fig. 5 is connected to a conductor 284 which ends on Fig. 5 at a terminal 286. This is available for connection to a terminal 286a on Fig. 6 of the drawing. The conductor 284 provides a signal for the "readout" control to be described.

The group of six relays 291 to 296 are provided, as shown in Fig. 6, for the purpose of storing the sound or syllable which is set up upon operation of the set of forty relays shown on Fig. 5 of the drawing. The code for each syllable is connected from a designated tongue of the relay 52 to one of the relays 291 to 296. When the syllable corresponding to a selected code for a sound or syllable is spoken into the microphone 14, the corresponding relay in the syllable memory 50 comprising the relays 291 to 296 will close and stay closed until it is released in a manner to be described hereinafter. Connections to the operating coils of these relays is made from the corresponding terminals 271a to 276a (Fig. 6). Assuming that the sound of the syllable or letter I is spoken into the microphone and that the code for I is connected through the first tongues of the set of relays of Fig. 5, then the relay 291 will be operated by application of ground from the conductor 284 to an appropriate contact of one of the forty relays of Fig. 5 of the drawing. The second level of the rotary switch is connected as stated above to the conductor 284 and the terminal 286. Inasmuch as connection of the relay contacts to the conductor 284 is a matter of choice in accordance with a selected code, these connections are not illustrated in detail on the drawing but are shown schematically in Figs. 9 and 10 for two selected sounds or syllables. The terminal 271a is then grounded when the letter I is spoken into the microphone and the relay coil of the relay 291 is energized over the connection 278a to the positive terminal of the power source. When the relay is energized its tongue 301 and front contact 302 locks this relay by its connection to a conductor 304. This conductor 304 is grounded in a manner to be hereinafter described, the ground connection being removed to unlock the relays connected to the conductor 304. The relays 291 to 296 are each provided with a grounded front contact and a tongue. In the foregoing and following, the term "back contact" of a relay is used to denote a normally closed contact which is opened when the relay is energized. The term "front contact" is used to denote a normally open contact which is closed when the relay is energized. The relay 291 is provided with a front contact 306 and a cooperating tongue 308. The contact 306 is connected to ground. The other five relays are similarly equipped. When any one of these relays is energized, ground is applied to a corresponding terminal of a set of terminals 311 to 316.

The previously mentioned terminal 286a, which is connected to the second level of the rotary switch 42, is connected to the operating coil of a relay 318. The grounded front contact of this relay and its tongue 518 applies ground to a terminal 321a when this relay is energized. This terminal is available for connection to a corresponding terminal 321b on Fig. 7 of the drawing. Energization of the relay 318 thus serves to start a stepper switch 325 shown on Fig. 7 of the drawing.

Figure 7:
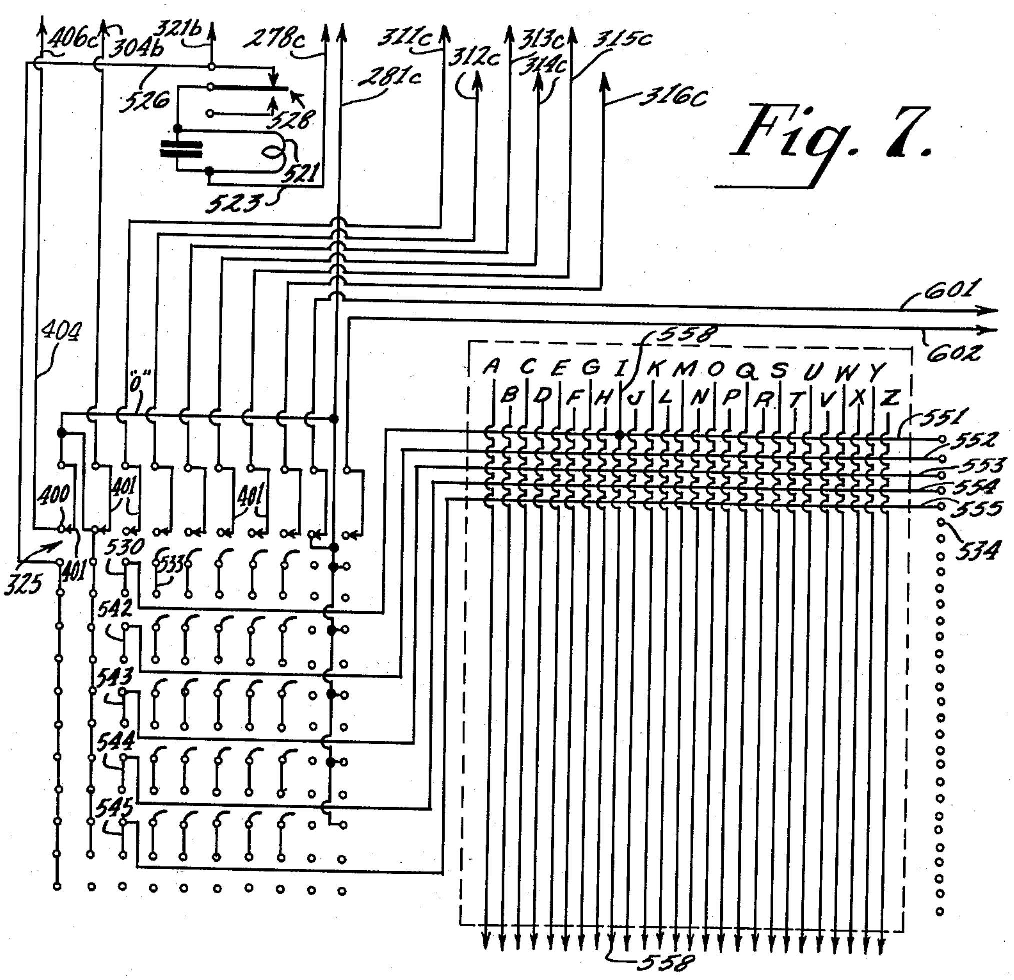
Fig. 7 is a schematic diagram of the letter memory of Fig. 1 and taking the form of a master letter decode switch.

The terminals 278a and 281a are duplicated as terminals 278b and 281b for connection to corresponding terminals 278c and 281c as designated on Fig. 7 of the drawing. Terminal 304a of conductor 304 is available for connection to terminal 304b on Fig. 7. This arrangement and duplication of terminals provides for ready connection of additional units in parallel with those shown and described in detail herein. Also, the distribution panel 350 shows, schematically, connection points for other units.

Fig. 7 of the drawing shows the letter decoder 351 appearing schematically on Fig. 2. The letter decoder 351 includes the previously mentioned stepper or sequence switch 325, which serves as a master letter decode switch, and a wiring matrix having twenty-six conductors for connection to the operating mechanism of a typewriter 280 and thirty conductors for connection to the contact bank of the rotary selector switch 325 in a manner to be described. The rotary switch 325 may be similar to the Automatic Electric Company Type Z–18750–1. Inasmuch as the stationary contact bank is duplicated the duplicate showing is omitted and it will be assumed that the switch has a single homing position and that the rotary wiper arms or contacts 401 return to this homing position after each complete stepping operation of the switch. The wiper arms 401 for the third to the eighth level of the switch are connected respectively to the previously mentioned terminals 311 to 316 of Fig. 6 by way of terminals 311c to 316c.

The wiper for the first level of the stepper switch is connected to the terminal 281c and thereby obtains a ground connection from the terminal 281b of Fig. 6.

The wiper for the second level of the switch is connected to the terminal 304b. This provides the locking connection to the conductor 304 of Fig. 6 applied by way of the terminal 304a.

The first stationary contact 400 of the first level of the switch 325 is connected to a conductor 404 and to a terminal 406c. This is connected in turn through terminals 406b and 406a to a terminal 406 on Fig. 5 of the drawing.

Figure 8:
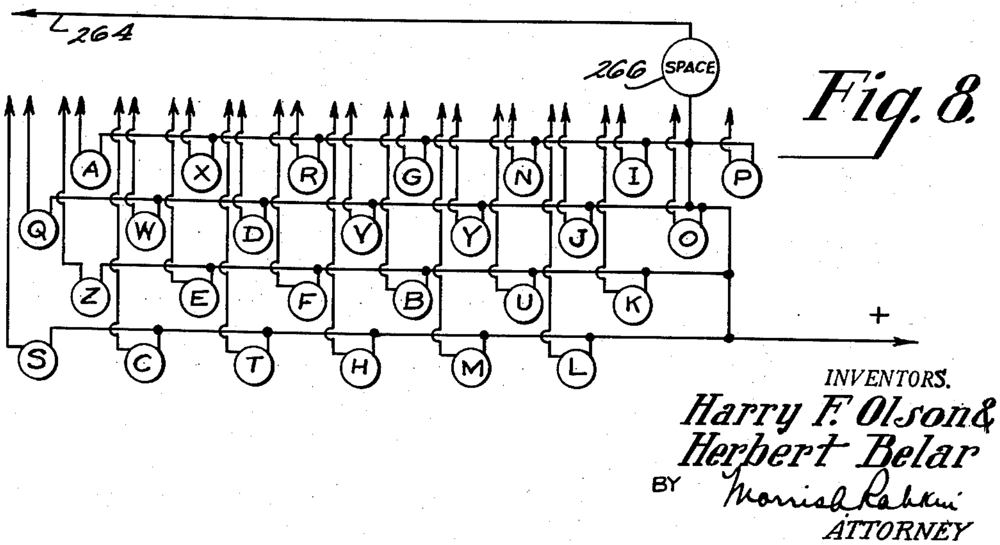
Fig. 8 is a schematic showing of the connections to the operating solenoids provided on a typewriter.

The terminal 406, which communicates with the first stationary contact 400 of the first level of the switch 325, is connected to the operating coil 408 of a relay 411. During the time the switch 325 remains in its homing position, as shown in Fig. 7 of the drawing, the relay coil 408 is energized and the previously mentioned relay 261 is deenergized to maintain locking energization of the set of forty relays and the set of forty code lamps of Fig. 5. The stepper switch 325 is started by the wiper arm 218 of the second level of the switch 42 coming into engagement with stationary contacts 516. This applies ground from the first level to the previously mentioned conductor 284 which is connected to the terminal 286. The latter is connected by way of the terminal 286a of Fig. 6 to the operating coil of the relay 318. When this relay is energized it applies ground by way of its tongue 518 and front contact to the terminal 321a which is in communication with the terminal 321b of Fig. 7. This causes energization of the operating coil 521 of the stepper switch 325. The circuit for the coil is completed through a conductor 523 and a terminal 278c which is connected to the terminal 278b of Fig. 6. The stepper switch 325 moves from its homing position when the relay 318 closes. This action occurs with a slight delay to isolate the stepper switch 325 from the stepper switch 42. When the stepper switch 325 moves from its homing position, ground applied to the conductor 404 at the contact 400 is interrupted which causes the relay 411 (Fig. 5) to be released. This causes energization of the relay 261 which interrupts the ground connection applied at the back contact 258. This releases the lamps and the relays on Fig. 5 so that a following spectral code may be set up in the bank of forty relays. The shunt condenser 407 provides for the delayed- or slow-release characteristic of the relay 261. As the stepper switch 325 progresses because of ground being applied to a conductor 526 and the mechanically controlled contacts 528 this stepper switch continues to operate until it again reaches the homing position in which application of ground to the conductor 526 is interrupted. When the stepper switch reaches the end of its travel and just before returning to the homing position, ground applied by way of the second level to the terminal 304b and the conductor 304 (Fig. 6) is interrupted thereby causing the relays 291 to 296 to be released. Immediately following this the stepper switch comes to its homing position and ground is restored to the conductor 404 thereby causing reenergization of the relay 408. Relay 261 has not as yet released and ground is then applied to the contacts 262 and 263 by way of contacts 527 and 529 to energize the solenoid 266 (Fig. 8). Shortly thereafter, the relay 261 completes its release operation. This sequence of events times the spacer operation.

The terminals 311c to 316c are connected from the third to the sixth levels, respectively, of the rotary switch 325. These connections correspond to the connections to the syllable code relays 291 to 296 of Fig. 6. The first connected pair 530 of stationary contacts in the third level is connected to the conductor 551 of the wiring matrix. The first connected pair 533 of contacts in the fourth level is connected to the conductor 534 of the wiring matrix. The successive pairs of contacts following the contacts 530 in the third level, namely contacts 542 to 545, are connected respectively to the matrix conductors 552 to 555. This pattern of connections is carried out for the entire matrix. The described connections of the rotary switch 325 to the wiring matrix is such that five letters can be typed in sequence for one sweep of the contact wipers 401. The pattern of connections to the matrix conductors for the stationary contacts of the rotary switch in the illustrative example of Fig. 7 is such that successive contacts in the first level are connected to the first five "horizontal" conductors proceeding from the top of the figure.

For the assumed example of the sound for the letter I it may be assumed that the relay 291 on Fig. 6 is operated and that ground is applied to the wiper 401 for the third level of the rotary switch 325. It will be assumed further that the operating conductor 558 for I or "i" of the typewriter mechanism is connected to the conductor 551 then as the rotary switch reaches the contact 530 for the conductor 551 it will cause the letter I to be typed. The contacts 542 to 545 will be connected to conductors in the matrix which are not connected to an operating solenoid for the typewriter.

The wiring matrix is provided with a set of twenty-six vertical conductors, including the conductor 558, designated by letters of the alphabet on Fig. 7 of the drawing. These twenty-six conductors are connected to the corresponding solenoids provided with armatures connected to the key levers of the typewriter. The general arrangement of Fig. 8 corresponds very generally to the location of the solenoids beneath the projecting key levers which extend out to the usual keys in a "standard" typewriter keyboard. It will be understood that this arrangement will be varied, depending on the type of recorder or typewriter that is employed.

Figure 10:
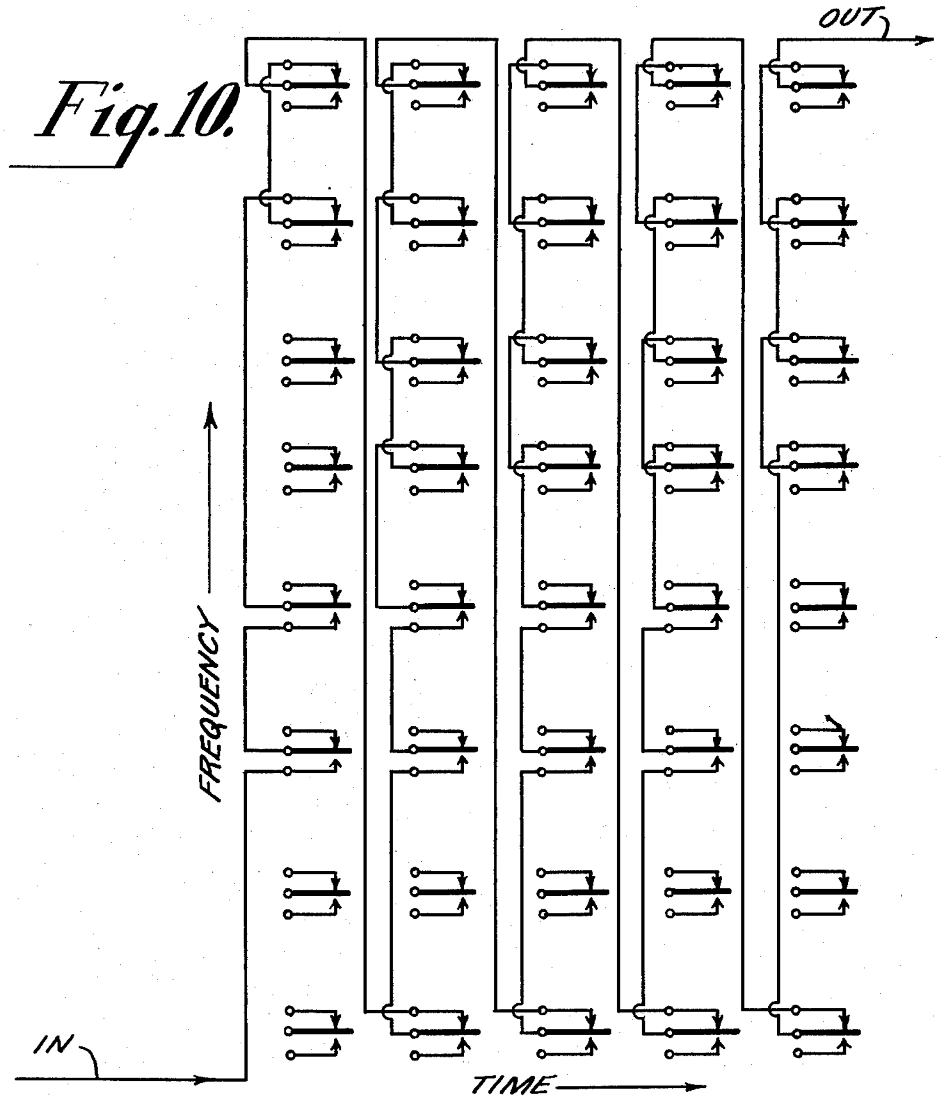
Figure 11:
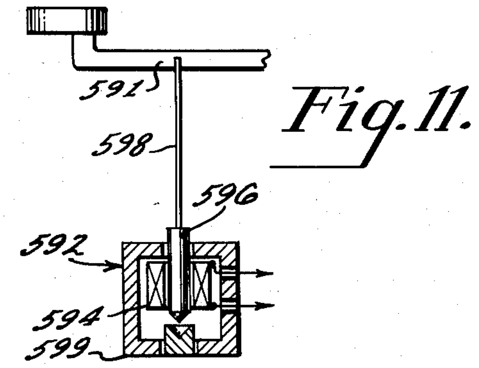
Fig. 11 is a schematic showing of a key lever and solenoid.

Details of a key lever 591 and its connected solenoid 592 are shown by way of example in Fig. 10 of the drawing. The solenoid comprises a coil 594 and a plunger 596. The tapered plunger is used in order to obtain a more uniform force over the range of travel of the plunger. The plunger is connected to the key lever 591 by means of a link 598. Reference character 599 designates the solenoid yoke.

The ninth and tenth levels of the rotary switch 325 are wired so that they may be employed to operate "slave" rotary switches which are similar in detail to the rotary switch 325. The wiper arm 401 of the ninth level is connected to a terminal 601. The wiper arm of the tenth level is connected to a terminal 602. These terminals are available for connection to the stepper and coil contacts and one of the levels of a "slave" rotary switch (not shown). One of these terminals 602 serves to actuate the slave rotary stepping switch step by step while the other terminal 601 provides connection to a homing circuit to insure synchronization.

Figure 9:
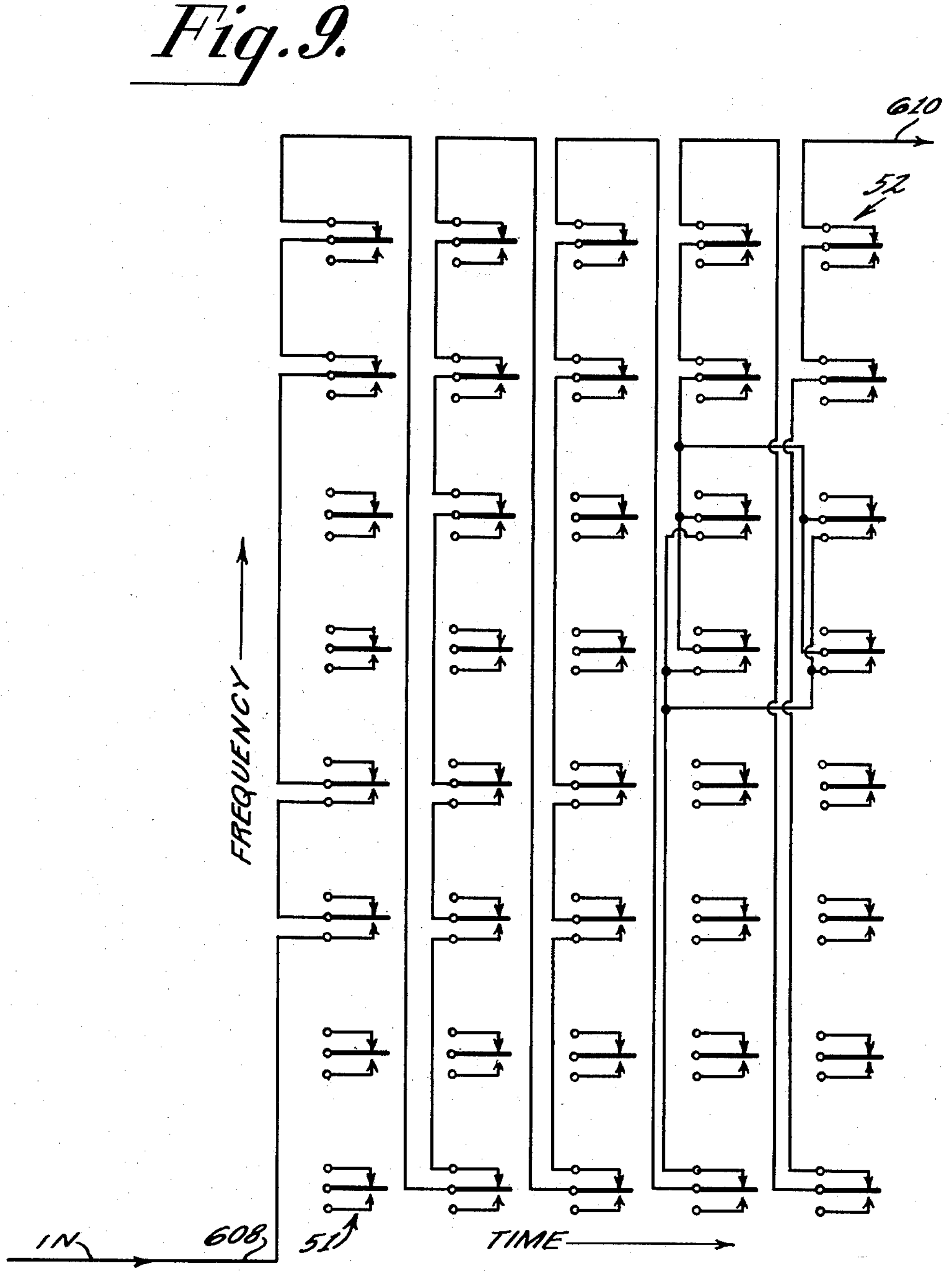
Figs. 9 and 10 show examples of relay code connections for two spoken sounds.

Figs. 9 and 10 show the code wiring for two selected sounds or characters. Referring to Fig. 9, a single set of contacts for each of the forty relays is shown. These are preferably corresponding contacts for each relay and it will be assumed that the relay tongues shown in Fig. 9 correspond to the tongue 241 of the relay 51. Fig. 9 indicates the manner in which the contact terminals and the terminal to the relay tongue are connected through the system of forty relays to provide a code such that a corresponding relay of Fig. 6 will be operated. The tongue and contacts of the first relay are labelled 51 to correspond with the showing of Fig. 5 and the tongue and contacts of the last relay of the set are labelled 52. In the schematic showing of Fig. 9 frequency is assumed to be plotted horizontally and time downwardly as viewed on Fig. 9. The connection 608 to the make, that is the normally open, contact of the third relay is to be connected, for the code shown, to the conductor 284 on Fig. 5 of the drawing. The connection 610 on Fig. 9 will be connected to the relay 291 in Fig. 6 of the drawing. When this relay is energized and the rotary switch 325 of Fig. 7 operates, then the conductor leading from one stationary contact of the rotary switch 325 will energize the solenoid for the character I through the matrix connection.

Fig. 10 of the drawing is similar to Fig. 9 but shows the code connection for the sound or syllable "ARE." A different cascaded set of contacts of the group of forty relays and a different relay from the group of relays 291 to 296 will serve as the syllable code and letter code respectively so that characters "a," "r" and "e" will be printed. Three contacts in the same level of the switch 325 are connected to conductors that are connected in the matrix to the solenoids for the characters "a," "r" and "e."

While the mode of operation of the several units of the system of Fig. 2 have been pointed out above in connection with the more detailed descriptions accompanying the more detailed showings of these units, the operation will be reviewed for the spoken syllable or letter I (ai). When this sound is spoken into the microphone 14 the output of the microphone is amplified by the amplifier 66 and compressed as explained in detail above by the compressor-amplifier 20. The output of the compressor-amplifier 20 is applied through the high pass filter 22 to the amplifier 24.

The output from the amplifier 24 is applied to the nine channels 31 to 39 where the sound is separated into eight frequency bands. The frequency relationship of the eight frequency bands is indicated on Fig. 2 of the drawing. Fig. 1 of the drawing shows the typical frequency response characteristic of the vowel sound or syllable "ai" without regard to selected center frequencies of the different frequency bands obtained the apparatus of Fig. 4. Fig. 1 also indicates time intervals of sampling for the construction of the curves of Fig. 1. In the illustrative example time intervals of sampling are provided by operation of the rotary switch 42 with a resulting display of lights as indicated on the diagrammatic showing of the spectral display 56 of Fig. 2.

Information in accordance with the spectral delay is stored in the forty relays of Fig. 5, the first of which, relay 51, and the last of which, relay 52, is shown in detail in Fig. 5 of the drawing. Coded wiring of the tongues and contacts of one chain or set of tongues and contacts operates one of the syllable code relays 291 to 296 of Fig. 6 of the drawing. Two examples of code wiring for the relay contacts of Fig. 5 are shown in Figs. 9 and 10 of the drawing. The amplifier in the channel 39 having the flat response provides a voice operated signal for starting the switch 42.

It will be noted from Fig. 2 that at least one light is lighted in the group of lights consisting of the twenty-ninth, thirtieth, thirty-seventh and the thirty-eighth. Since one or more of these lights is lighted, and the corresponding relay is energized for the syllable "ai," the relays of this group are wired in parallel to recognize the sound for the syllable "ai" as compared with the sound for the syllable "are." It will be understood that other groups of parallel connected relays may also be employed where a sound or syllable is distinguished by operation of one of the relays of a recognized group of relays.

Once a syllable code relay, for example the syllable code relay 291 of Fig. 6, is selected ground is applied to one of the levels of the rotary switch 325 of Fig. 7. In the illustrative example ground is applied to the wiper arm for the third level of the rotary switch 325 when the syllable "ai" is spoken into the microphone 14. When the wiper arms of the switch 325 move in response to the signal from the second level of the rotary switch 42, by way of the conductor 284 which operates the relay 318, successive contacts of the relay 325 are scanned by the arms resulting in printing of the letter I. This is accomplished by the wiper arm applying a signal to the conductor 551 of the wiring matrix on Fig. 7 of the drawing.

If the syllable "are" is spoken into the microphone 14 the selected relay from the group of relays 291 to 296 will cause three successive wires of the matrix to be energized successively thereby to energize the solenoids for the three letters to spell out the word "are." This arrangement provides for a choice of spellings for words or syllables.

A switch 631 (Fig. 5) is provided so that the connection to the relay 318 of Fig. 6 may be interrupted. This prevents operation of the read-out function. A switch 641 is provided for interrupting the connection to the spacing mechanism 266 (Fig. 8). A switch 651 is provided for interrupting the connection to ground established by way of the contact 258 of the relay 261 to the conductor 256. These switches may be employed in different ways for test and demonstration purposes.

What is claimed is:

1. Apparatus for analyzing the sound of a speech syllable comprising means for separating said sound into a plurality of sound components of different frequencies, means for determining the presence and relative strength of all of said components, means for operating said last named means at successive times during the existence of said syllable, means for storing information as to the presence or absence of individual ones of said components at each determination, means for displaying a visual indication of said stored information, and means for determining the presence of selected syllables in response to all of said stored information after an interval including said successive times.

2. Apparatus for operating a character printing device in response to an electrical signal representing sounds of speech comprising means for separating said electrical signal into a plurality of simultaneously occurring signals in different frequency bands, means for testing said frequency bands at a definite number of successive times to determine the presence or absence of signals in said different frequency bands, means for storing test signals resulting from the testing of each of said frequency bands at each of said successive times, a coded circuit, means for causing operation of said coded circuit in response to all of said stored test signals after said successive times, and means for causing the selection and printing of a character in response to operation of said coded circuit.

3. A system for storing printer operating signals developed in response to speech sounds comprising means for converting speech sounds to a voice frequency electrical signal, an amplifier for amplifying said signal, a compressor amplifier for compressing the amplitude range of said signal amplified by said amplifier, a plurality of signal channels, each channel being capable of passing a component signal in a predetermined frequency range, a single signal channel capable of passing said amplified and compressed signal without selective attenuation, means for applying said amplified and compressed signal simultaneously to said plurality of signal channels, a sequence switch having a plurality of levels of successively arranged stationary contacts, a wiper arm for each level, means for causing each of said wiper arms successively to traverse the stationary contacts of its level, means to connect each of said frequency selective signal channels to one of said wiper arms, a plurality of successively arranged relays, means to connect successive ones of said relays separately to the first stationary contact in each of said levels and means to connect further successive ones of said relays to further stationary contacts successively in like manner, a connection from said means for causing wiper arm traverse to said single signal channel, each of said relays having at least one contact tongue and a normally open and normally closed stationary contact cooperating with said tongue, code wiring means interlinking said contact tongues and said cooperating stationary normally open and normally closed contacts of said plurality of relays, a set of storage relays, each of said relays of said additional set having a pair of normally open contacts, and a connection from said code wiring means to one relay of said set of storage relays.

4. A system for operating a printer in response to speech sounds comprising means for converting speech sounds to a voice frequency electrical signal, an amplifier for amplifying said signal, a compressor amplifier for compressing the amplitude range of said signal amplified by said amplifier, a plurality of signal channels, each channel being capable of passing a component signal in a predetermined frequency range, a single signal channel capable of passing said amplified and compressed signal without selective attenuation, means for applying said amplified and compressed signal simultaneously to said plurality of signal channels, a sequence switch having a plurality of levels of successively arranged stationary contacts, a wiper arm for each level, means for causing each of said wiper arms successively to traverse the stationary contacts of its level, means to connect each of said frequency selective signal channels to one of said wiper arms, a plurality of successively arranged relays, means to connect successive ones of said relays separately to the first stationary contact in each of said levels and means to connect further successive ones of said relays to further stationary contacts successively in like manner, a connection from said means for causing wiper arm traverse to said single signal channel, each of said relays having a plurality of contact tongues and a normally open and normally closed stationary contact cooperating with each of said tongues, a plurality of code wiring means, each of said code wiring means interlinking one of said contact tongues and said cooperating stationary normally open and normally closed contacts of said plurality of relays, an additional set of relays, each of said relays of said additional set having a pair of normally open contacts, a connection from each of said code wiring means to one relay of said additional set of relays, a second sequence switch having a plurality of levels of successively arranged stationary contacts, a wiper arm for each level of said second sequence switch, a connection from each of said normally open contacts of said additional set of relays to each of said wiper arms, a printer mechanism having a plurality of means for printing characters, a plurality of conductors arranged in side-by-side parallel relationship, one for each of said character printing means, a set of conductors arranged in side-by-side parallel relationship and separately connected to the first one of said successively arranged stationary contacts in all levels of said second-named sequencing switch, successive sets of conductors similarly arranged and connected to said remaining stationary contacts of said second sequence switch, said sets of conductors being disposed at right angles to each said first named plurality of conductors to permit interconnection of a predetermined conductor in said plurality of conductors with a predetermined conductor in one of said sets of conductors, and means connected to one of said wiper arms of said first-named sequence switch for initiating stepping operation of said second-named sequence switch.

5. A system for operating a printer in response to speech sounds comprising means for converting speech sounds to a voice frequency electrical signal, an amplifier for amplifying said signal, a compressor-amplifier for compressing the amplitude range of said signal amplified by said amplifier, a plurality of signal channels, each channel being capable of passing a component signal in a predetermined frequency range, a single signal channel capable of passing said amplified and compressed signal without selective attenuation, means for applying said amplified and compressed signal simultaneously to said plurality of signal channels, a sequence switch having a plurality of levels of successively arranged stationary contacts, a wiper arm for each level, means for causing each of said wiper arms successively to traverse the stationary contacts of its level, means to connect each of said frequency selective signal channels to one of said wiper arms, a plurality of successively arranged relays, means to connect successive ones of said relays separately to the first stationary contact in each of said levels and means to connect further successive ones of said relays to further stationary contacts successively in like manner, a connection from said means for causing wiper arm traverse to said single signal channel, each of said relays having at least one contact tongue and a normally open and normally closed stationary contact cooperating with said tongue, code wiring means interlinking said contact tongues and said cooperating stationary normally open and normally closed contacts of said plurality of relays, an additional set of relays, each of said relays of said additional set having a pair of normally open contacts, a connection from said code wiring means to one relay of said additional set of relays, a second sequence switch having a plurality of levels of successively arranged stationary contacts, a wiper arm for each level of said second sequence switch, a connection from each of said normally open contacts of said additional set of relays to each of said wiper arms, a printer mechanism having a plurality of means for printing characters, a plurality of conductors arranged in side-by-side parallel relationship, one for each of said character printing means, a set of conductors arranged in side-by-side parallel relationship and separately connected to the first one of said successively arranged stationary contacts in all levels of said second-named sequencing switch, successive sets of conductors similarly arranged and connected to said remaining stationary contacts of said second sequence switch, said sets of conductors being disposed at right angles to said first named plurality of conductors to permit interconnection of a predetermined conductor in said plurality of conductors with a predetermined conductor in one of said sets of conductors, and means connected to one of said wiper arms of said first-named sequence switch for initiating stepping operation of said second-named sequence switch.

6. A system for deriving code signals in response to speech sounds for control purposes comprising means for converting speech sounds to a voice frequency electrical signal, an amplifier for amplifying said signal, a compressor amplifier for compressing the amplitude range of said signal amplified by said amplifier, a plurality of signal channels, each channel being capable of passing a component signal in a predetermined frequency range, a single signal channel capable of passing said amplified and compressed signal without selective attenuation, means for applying said amplified and compressed signal simultaneously to said plurality of signal channels, a sequence switch having a plurality of levels of successively arranged stationary contacts, a wiper arm for each level, means for causing each of said wiper arms successively to traverse the stationary contacts of its level, means to connect each of said frequency selective signal channels to one of said wiper arms, a plurality of successively arranged relays, means to connect successive ones of said relays separately to the first stationary contact in each of said levels and means to connect further successive ones of said relays to further contacts successively in like manner, a connection from said means for causing wiper arm traverse to said single signal channel, each of said relays having at least one contact tongue and a normally open and normally closed stationary contact cooperating with said tongue, and code wiring means interlinking said contact tongues and said cooperating stationary normally open and normally closed contacts of said plurality of sets of relays.

7. A system for deriving code signals in response to speech sounds for control purposes comprising means for converting speech sounds to a voice frequency electrical signal, an amplifier for amplifying said signal, a compressor amplifier for compressing the amplitude range of said signal amplified by said amplifier, a plurality of signal channels, each channel being capable of passing a component signal in a predetermined frequency range, a single signal channel capable of passing said amplified and compressed signal without selective attenuation, means for applying said amplified and compressed signal simultaneously to said plurality of signal channels, a sequence switch having a plurality of levels of successively arranged stationary contacts, a wiper arm for each level, means for causing each of said wiper arms successively to traverse the stationary contacts of its level, means to connect each of said frequency selective signal channels to one of said wiper arms, a plurality of successively arranged relays, means to connect successive ones of said relays separately to the first stationary contact in each of said levels and means to connect further successive ones of said relays to further stationary contacts successively in like manner, a connection from said means for causing wiper arm traverse to said single signal channel, each of said relays having at least one contact tongue and a normally open and normally closed stationary contact cooperating with said tongue, code wiring means interlinking said contact tongues and said cooperating stationary normally open and normally closed contacts of said plurality of sets of relays, a plurality of lamps and contact means associated with said plurality of relays to indicate operation thereof.

8. A system for storing control signals developed in response to speech sounds comprising means for converting speech sounds to a voice frequency electrical signal, a plurality of signal channels, each channel being capable of passing a component signal in a predetermined frequency range, means for applying said voice frequency electrical signal simultaneously to said plurality of signal channels, cyclically operated distributor means for simultaneously receiving signals from all of said plurality of signal channels, a plurality of groups of successively arranged relays, different relays in each of said groups corresponding individually to different ones of said channels, means to connect successive ones of said relays in each of said groups separately through said distributor means to their corresponding signal channels, means to connect further successive ones of said relays in others of said groups through said distributor means to their corresponding signal channels in like manner at successive times during a cycle of operation of said distributor means, each of said relays having at least one contact tongue and a normally open and normally closed stationary contact cooperating with said tongue, and code wiring means interlinking said contact tongues and said cooperating stationary normally open and normally closed contacts of said plurality of relays.

9. A system for storing control signals developed in response to speech sounds comprising means for converting speech sounds to a voice frequency electrical signal, a plurality of signal channels, each channel being capable of passing a component signal in a predetermined frequency range, means for applying said voice frequency electrical signal simultaneously to said plurality of signal channels, cyclically operative distributor means for simultaneously receiving signals from all of said plurality of signal channels, said distributor means having a plurality of outputs, each for a different one of said channels, a plurality of successively arranged storage relays, means to connect successive ones of said relays separately to said distributor means outputs whereby signals from said channels are applied separately to said successive ones of said relays, means to connect further successive ones of said relays separation to said distributor means outputs in like manner whereby signals from said channels are applied separately to said further successive ones of said relays, each of said relays having at least one contact tongue and a normally open and normally closed stationary contact cooperating with said tongue, code wiring means interlinking said contact tongues and said cooperating stationary normally open and normally closed contacts of said plurality of relays, an additional set of storage relays, each of said relays of said additional set having a pair of normally open contacts, and a circuit including a connection from said code wiring means to one relay of said additional set of storage relays, and means for completing said connection after each cycle of operation of said distributor means.

10. Apparatus for analyzing the sound of speech syllables which comprises means for determining the presence of selected syllables each identified by one of a plurality of different codes, each of said codes having a plurality of code elements, means determining the presence of sound components of said syllables, and means for translating said sound components into the form of elements of said code and for presenting all of said elements to said first-named means simultaneously for determining if any of said different codes is satisfied.

11. Apparatus for analyzing the sound of speech syllables which comprises means for determining the presence of selected sound syllables including a plurality of circuits, each of said circuits having a plurality of successive switchable connections for each syllable, and means for determining the presence of different sound components of said speech syllables at each of a plurality of repeated intervals for operating said first-named means to switch different ones of said connections at each of said intervals whereby the completion of any of said circuits after said intervals determines the presence of a syllable.

12. Apparatus for analyzing the sound of speech syllables which comprises means for separating said sound into a plurality of sound components, storage means for said sound components, said storage means having a plurality of locations for storage of said sound components, said locations being arranged in accordance with a plurality of different codes for different selected speech syllables, and means for applying groups of said sound components simultaneously to said storage means at repeated intervals for storage individually in different groups of locations in said storage means, said selected syllables being stored in said storage means after said repeated intervals if any of said codes are satisfied.

13. Apparatus for analyzing the sound of a speech syllable which comprises means for separating said sound into a plurality of sound components of different frequencies, means for determining the presence and relative strengths of all of said components simultaneously at repeated intervals, and means responsive to the existence of selected syllables operated by said last-named means only after a predetermined number of said intervals if, and only if, the presence of sound components of certain strength of any of said selected syllables is determined at each of said repeated intervals.

14. Apparatus for analyzing the sound of a speech syllable which comprises means for determining the presence of a plurality of sound components of said syllable at repeated intervals during the sounding of said syllable, means for storing information as to which of said components are individually present at each of said intervals, and means responsive to the existence of selected syllables operated by said first-named means in response to all of said information stored after a predetermined number of said intervals if, and only if, the presence of sound components of any of said selected syllables is determined.

15. Apparatus for analyzing the sound of speech syllables which comprises a memory for storing components of sound information at different locations therein, said locations being in an ordered arrangement, information corresponding to selected syllables being stored in certain of said different locations in said memory, and means responsive to sounded speech syllables for determining the presence of sound components and for applying said components individually to separate ones of said locations in ordered groups of said locations at repeated intervals for storage therein at said locations, the presence of any of said selected syllables being determined by the presence or absence of said components at said certain locations.

16. Speech analysis apparatus which comprises a pair of memories for storing information in digital form, means for storing sound information in a first of said memories at successive intervals, said last-named means including means whereby each digit of said information stored at each of said intervals represents a different component of said sound, and means for transferring digital information corresponding to information stored in said first memory to the second of said pair of memories after a predetermined number of said intervals.

17. Speech analysis apparatus which comprises a first memory for storing, for the duration of individual speech syllables, information representing spectral components of speech to be analyzed, each component being representative of a different frequency band of said speech syllables, a second memory for storing information corresponding to certain syllables, and means associated with said first memory for transferring information from said first memory to said second memory after said period, said information being received for storage in said second memory if any combination of components stored in said first memory constitutes any of said certain syllables.

18. Speech analysis apparatus which comprises a memory for storing speech information corresponding to individual components of said speech, means for storing said components of speech information in said memory at certain intervals during a given period, said last named means including means for translating said information into the form of different codes, another memory for storing speech information in the form of certain of said codes, and means included in said first-named memory for transferring all of the information in said first-named memory to said other memory after said given period for storage in said other memory, if any of said certain codes are satisfied.

19. Apparatus for analyzing the sound of a speech syllable which comprises a first memory for receiving information in digital form, means for determining the presence of sound components of said syllable at repeated intervals and storing digital information corresponding to individual ones of said components in said first memory, a second memory for storing information corresponding to certain digital codes, and means for comparing said information stored in said first memory with said certain digital codes and for operating said second memory if, and only if, any one of said digital codes is satisfied.

20. Speech analysis apparatus which comprises means for providing electrical signals corresponding to spectral components of speech energy during sounding of a speech syllable, a memory, means for applying said signals to said memory at successive intervals during the sounding of said syllable, means included in said memory responsive to said signals for translating said components into information in digital form, another memory for storing digital information representing certain digital codes, each of said codes representing a different syllable, and means for comparing digital information from said first-named memory with said certain digital codes in said other memory after a predetermined number of said successsive intervals and transferring information from said first memory to said other memory when said information in said first-named memory satisfies said certain digital codes.

21. Speech analysis apparatus which comprises a memory having storage for information as to the presence or absence of different sound components of said speech, said memory having a first plurality of locations each providing storage for said information for corresponding ones of said components, said memory also having a second plurality of locations each providing storage for said information for other said components which correspond to each other, means for determining the presence or absence of all of said sound components and for applying said information to different ones of said first locations and for successively applying said information to different ones of said second locations, and means responsive to said stored information for recognizing selected syllables.

22. Apparatus for analyzing speech which comprises a memory means having storage devices for information in the form of a plurality of digits, means for applying to said memory information derived from the speech to be analyzed, said means for applying including means whereby storage of said digits is represenative of components of said speech in different frequency bands of said speech, a plurality of further storage devices adapted to be coupled to said memory, and means for actuating one or another of said further storage devices in response to the storage of certain digits in said memory means.

23. Apparatus for analyzing speech which comprises a memory having storage for information in the form of a plurality of digits, said memory comprising a plurality of switching devices, each for storing different ones of said digits, and a plurality of circuits interconnecting said switching devices which are completed when certain digits are stored in said memory, means for storing information in said memory derived from said speech to be analyzed, said last named means including means whereby each digit of said stored information is representative of a separate component of said speech, and a plurality of storage devices, each connected to said circuits individually for independently storing information corresponding to a plurality of said digits.

References Cited in the file of this patent

UNITED STATES PATENTS

| | | |
|---|---|---|
| 2,238,555 | Dudley | Apr. 5, 1941 |
| 2,575,909 | Davis et al. | Nov. 20, 1951 |
| 2,575,910 | Mathes | Nov. 20, 1951 |
| 2,594,731 | Connolly | Apr. 29, 1952 |
| 2,646,465 | Davis et al. | July 21, 1953 |